A. D. PARKER.
COMBINED STRAINER AND CUT-OFF FOR CISTERNS.
No. 174,701. Patented March 14, 1876.
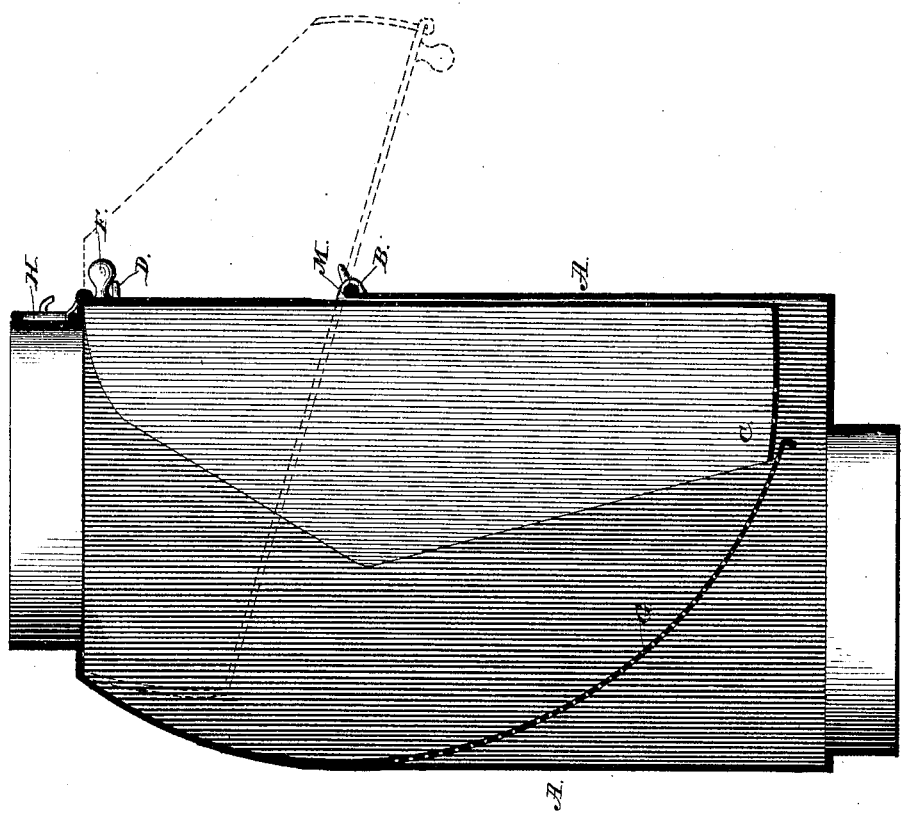
Attest:
Edwin A. Bulwinjour
Geo. H. Elkerton
Inventor:
Alfred D. Parker.

UNITED STATES PATENT OFFICE.

ALFRED D. PARKER, OF GRAND RAPIDS, MICHIGAN.

IMPROVEMENT IN COMBINED STRAINERS AND CUT-OFFS FOR CISTERNS.

Specification forming part of Letters Patent No. 174,701, dated March 14, 1876; application filed February 8, 1876.

*To all whom it may concern:*

Be it known that I, ALFRED D. PARKER, of Grand Rapids, Kent County, Michigan, have invented a Combined Strainer and Cut-off for Cisterns, of which the following is a specification:

The object of my invention is the construction of a strainer for water or other liquids passing into cisterns or other receptacles, with such an apparatus for cutting off the water, &c., that when assuming the position to cut off the water, &c., it acts as a scraper to the sieve, and, when in position to cut off the water, becomes immediately transformed into a spout through which the superabundance of water and such filth as may have accumulated in the strainer may, and will, readily run off outside the cistern.

In the drawing, A represents my invention complete; G, the strainer; C, a scraper, when its long side stands perpendicular in the strainer, and while passing from that position to a horizontal one, but, when the same assumes a horizontal position, immediately becoming a cut-off and spout. H is a wire with hooks bent upon each end to fit eyes D, to hold scraper and spout in proper positions. M are bearings through which wire B passes, acting as hinges for part C to turn upon when being transformed from a scraper into a spout. By the removal of wire B, spout C may be removed entirely from the strainer.

It will be observed that the sieve portion of my strainer is made concave, and set either perpendicular or at an inclination upward, which gives a larger surface for water to pass through than otherwise placed, at the same time necessitating the passage of all leaves and other obstructions off from the face of the strainer into the bottom, which is the short and horizontal portion of the scraper C. When all four of the outer sides of the strainer are perpendicular, then water can pass through conductors and strainers into cistern. Now, to shut water off from cistern, pull knob F outward and downward, and the perpendicular side of scraper will assume a horizontal position, the outer edge of scraper passing closely to and against the sieve, carrying with it all obstructions and filth, until the long side attains a horizontal position and the water is shut off, and the scraper is transformed immediately into a spout, through which the water runs off, carrying with it all obstructions.

What I claim as new, and desire patented, is—

The above-described combined strainer and cut-off, having a concave perforated part, G, set perpendicular or at an angular inclination upward with the scraper, spout C so arranged as to act as scraper, cut-off, and spout, operated by means of thumb-knob F, or its equivalent, as and for the purpose set forth.

ALFRED D. PARKER.

Witnesses:
EDWIN A. BURLINGAME,
GEO. H. ELKERTON.